United States Patent
Kim et al.

[19]

[11] Patent Number: 6,118,926
[45] Date of Patent: Sep. 12, 2000

[54] METHOD FOR PREPROGRAMMING A VIDEO CASSETTE RECORDER

[75] Inventors: Jae-Key Kim; Keun Park; Byeong-Hoo Cheon, all of Seoul, Rep. of Korea

[73] Assignee: Daewoo Electronics Co., Ltd., Seoul, Rep. of Korea

[21] Appl. No.: 09/200,022

[22] Filed: Nov. 25, 1998

Related U.S. Application Data

[63] Continuation-in-part of application No. 08/589,742, Jan. 22, 1996, abandoned, which is a continuation-in-part of application No. 08/336,607, Nov. 9, 1994, abandoned, which is a continuation-in-part of application No. 08/149,074, Nov. 9, 1993, abandoned.

[30] Foreign Application Priority Data

Nov. 9, 1992 [KR] Rep. of Korea ............... 92-20954

[51] Int. Cl.[7] .................................................. H04N 5/76
[52] U.S. Cl. ............................................................ 386/83
[58] Field of Search .................................. 386/46, 83, 95; 348/906

[56] References Cited

U.S. PATENT DOCUMENTS 4,193,120  3/1980  Yello ............................................ 386/83
5,335,079  8/1994  Yuen et al. .................................. 386/83
5,546,193  8/1996  Hailey et al. ............................... 386/83

*Primary Examiner*—Huy Nguyen
*Attorney, Agent, or Firm*—Anderson Kill & Olick, PC

[57] ABSTRACT

A method preprograms a video cassette recorder (VCR) to record a desired television (TV) program. When a reservation key is pressed by the VCR's user for the preprogramming of the VCR, a preprogramming commencement signal is issued. In response to the preprogramming commencement signal, a recording start time, a recording channel and a recording tape speed are automatically set all at once. A recording end time is obtained by adding a predetermined duration of recording to the recording start time. The recording start time set and the recording end time are adjusted to an actual recording start time and an actual recording end time, respectively, through the use of an on touch screen manner. Finally, if there is a preprogramming completion signal from the user after adjusting the recording start time and the recording end time, the preprogramming information including the adjusted recording start time, the recording channel, the recording tape speed and the adjusted recording end time is accepted to preprogram the desired TV program, wherein the preprogramming information is stored and the VCR is entered into a stand-by mode until the recording starts.

9 Claims, 9 Drawing Sheets

FIG. 9A

```
TIMER RESERVATION
CHANNEL : 07
TAPE SPEED : LP
DATE : TODAY
START TIME : 09:35
END TIME : 11:35
RESERVATION COMPLETES
AFTER 10 SEC.
```

FIG. 9B

```
TIMER RESERVATION
CHANNEL : 09
TAPE SPEED : SP
DATE : TOMORROW
START TIME : 20:25
END TIME : 21:55
```

METHOD FOR PREPROGRAMMING A VIDEO CASSETTE RECORDER

CROSS-REFERENCE TO THE RELATED APPLICATIONS

This application is a continuation-in-part of U.S. Ser. No. 08/589,742 filed on Jan. 22, 1996, abandoned, which is a continuation-in-part of U.S. Ser. No. 08/336,607 filed on Nov. 9, 1994, abandoned, which is a continuation-in-part of U.S. Ser. No. 08/149,074 filed on Nov. 9, 1993, abandoned.

FIELD OF THE INVENTION

The present invention relates to a video cassette recorder (VCR) having the capability of performing timer-controlled preprogramming in a simple and efficient manner.

DESCRIPTION OF THE PRIOR ART

Nowadays, most VCRs are provided with the capability of recording a desired television broadcast program at a designated time for a certain duration under the control of a timer. In order to set up the VCR to record the desired TV broadcast program in advance, various preprogramming information must be inputted through a series of operations which may comprise: fixing time data in the order of month, day and year in the timer to designate when the recording of the desired program is to be carried out; setting a recording start time and a recording end time; selecting any one of the available tape running speeds, e.g., SP (Standard Playback), LP (Long Playback) and SLP (Super Long Playback); selecting a TV channel through which the desired broadcast program is to be received; and then pressing a RECORD key on the VCR or a remote control unit.

If any of the operations is erroneously carried out, the desired broadcast program cannot be recorded correctly; and, the above series of complex operations makes the prior art method vulnerable to such an error.

In order to simplify and accurately perform the timer-controlled preprogramming, therefore, there have been proposed several techniques in the art, including the one disclosed in PCT/US89/05806 filed on Dec. 16, 1989, wherein the task of preprogramming is simplified through the use of encoded information which is referred to as a G-code made of, e.g., 7 digits. This method of preprogramming is accomplished by looking up a G-code printed in, e.g., a TV program guide and entering the G-code instead of the channel, date, time and length (CDTL) data. When the G-code is entered, it is converted into the CDTL information by a G-code decoder incorporated in a VCR.

Even though the G-code method is capable of offering a shortened preprogramming procedure, it suffers from a lack of flexibility as its utility entirely depends on the availability and accuracy of the G-codes printed in the media. Furthermore, in case there is a change in the printed television program, the given G-code cannot be used.

SUMMARY OF THE INVENTION

It is, therefore, a primary object of the invention to provide an improved VCR capable of performing timer-controlled preprogramming in a simplified and flexible manner.

In accordance with the present invention, there is provided a method for timer-controlled preprogramming a video cassette recorder (VCR) to record a desired television (TV) broadcast program, the method comprising the steps of:

(a) generating a preprogramming commencement signal when the VCR's user presses a key, corresponding to the commencement signal, on a key matrix of the VCR or remote control unit to record the preprogramming of the VCR;

(b) automatically setting, in response to the preprogramming commencement signal, a recording start time, a recording channel and a recording tape speed all at once, wherein the recording start time is set at a current time clocked at the time of preprogramming, the recording channel is set to a current channel tuned at the time of preprogramming and the recording tape speed is set at a predetermined recording tape speed;

(c) determining a recording end time by adding a predetermined duration of recording to the recording start time;

(d) displaying, on the TV screen, the recording start time, the recording channel, the recording tape speed and the recording end time;

(e) adjusting the recording start time displayed on the TV screen in an on touch screen manner for it to coincide with an actual broadcast schedule of the desired TV broadcast program and adjusting the recording end time displayed on the TV by adding the predetermined duration of recording to the adjusted recording start time by using the on touch screen manner; and (f) deciding whether or not a preprogramming completion signal has been received from the VCR's user after performing the step (e), and, if there is the preprogramming completion signal from the VCR's user, accepting preprogramming information including the adjusted recording start time, the recording channel, the recording tape speed and the adjusted recording end time to preprogram the desired TV broadcast program, storing the preprogramming information into a storage device of the VCR and controlling a recording/playback device of the VCR so that the VCR enters into a stand-by mode until the adjusted recording start time reaches.

BRIEF DESCRIPTION OF THE DRAWINGS

The above and other objects and features of the present invention will become apparent from the following description of preferred embodiments given with reference to the accompanying drawings, in which:

FIGS. 9A and 9B are on-screen graphics developed on a screen during the timer-controlled preprogramming.

DETAILED DESCRIPTION OF THE PREFERRED EMBODIMENTS

Figure 1:
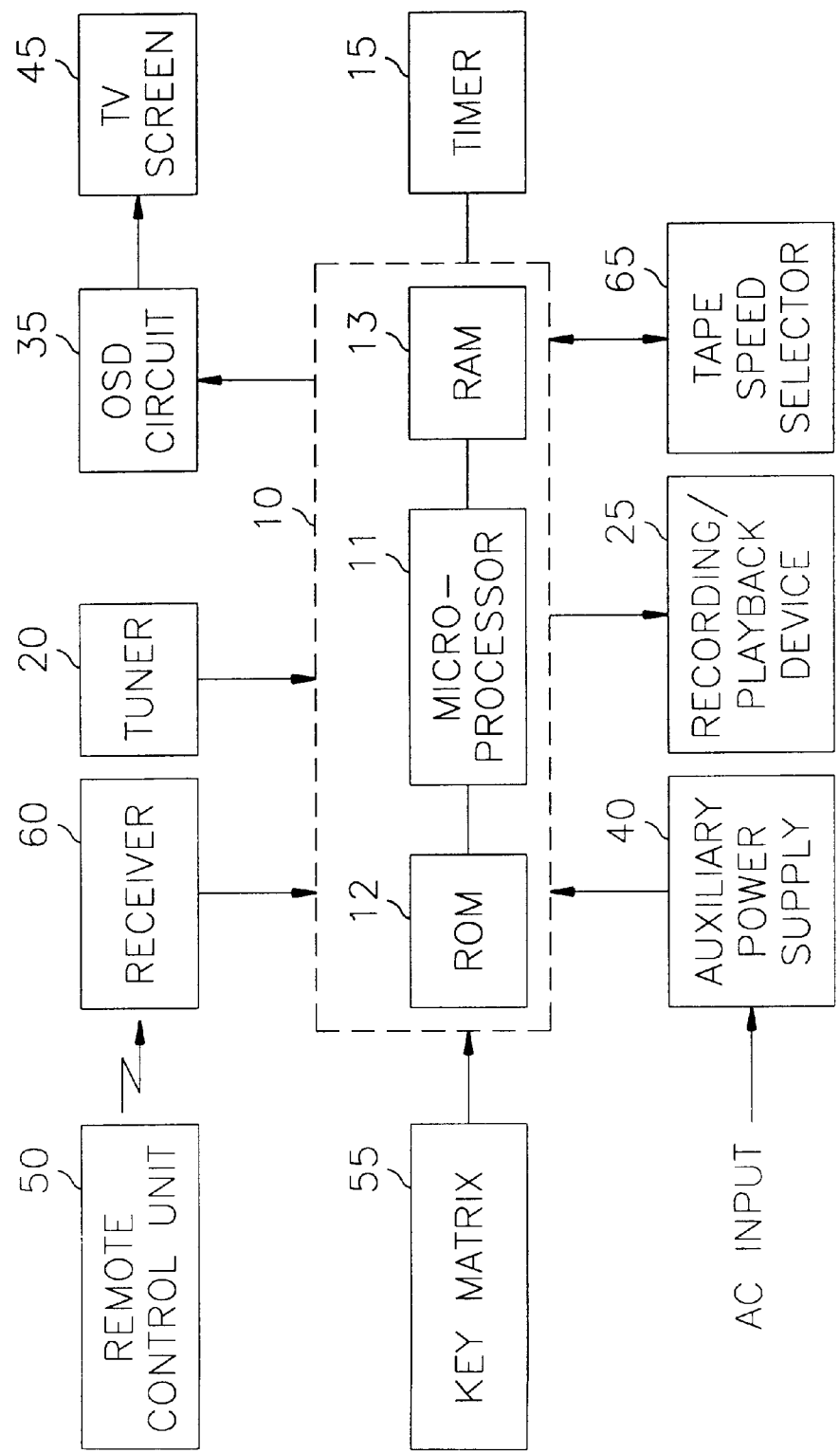
FIG. 1 is a block diagram of a VCR capable of performing the timer-controlled preprogramming in accordance with the present invention.

Referring to FIG. 1, there is shown a VCR having basic components required to carry out timer-controlled preprogramming in accordance with the present invention.

A system controller 10, which may be implemented with a microcomputer, includes a microprocessor 11, a read only memory (ROM) 12 in which various programs may be stored, and a random access memory (RAM) 13 to store data and preprogramming information that may be changed or updated during the operation of the microprocessor 11.

A timer 15 includes a real time clock which is normally provided in the VCR to offer time and date information. A tuner 20 is provided with necessary circuits for receiving a TV broadcast program in a known manner. Under a control of the system controller 10, any one of the broadcast programs selected by the tuner 20 can be reserved or preset for the preprogrammed recording thereof.

A recording/playback apparatus 25 connected to the system controller 10 employs a mechanism which performs various mechanical functions for the VCR. The mechanical functions may include loading and unloading of a magnetic tape, recording of video signals on the magnetic tape, reproduction of the video signals recorded on the magnetic tape and the like.

An OSD (on screen display) circuit 35, under a control of the system controller 10, generates on-screen graphics for the display of preprogramming information on a television (TV) screen 45 associated with the VCR in accordance with a display algorithm which prompts the user to enter the preprogramming data using the keys provided on a remote control unit 50 or on a key matrix 55.

The key matrix 55 built in the VCR is provided with a number of keys which may be the same as those in the remote control unit 50 which will be fully discussed hereinafter. A tape speed selector 65 serves to select any one of the available tape running speeds such as SP, LP and SLP to control the tape speed under the control of the system controller 10.

Connected to the system controller 10 is a receiver 60 which receives a command signal transmitted from the remote control unit 50 and converts it to an electrical signal to use in the system controller 10.

Also provided in the VCR is an auxiliary power supply 40, which is coupled to a main power supply (not shown), prepared to supplement an interruption of the main power supply in the event of, e.g., a power failure. The auxiliary power supply 40 is actuated at a time when an AC input from the main power supply is interrupted due to the power failure or disconnection; and maintains the timer 15 and the system controller 10 to save the time data in the timer 15 and the preprogramming information stored in the RAM 13.

Figure 2:
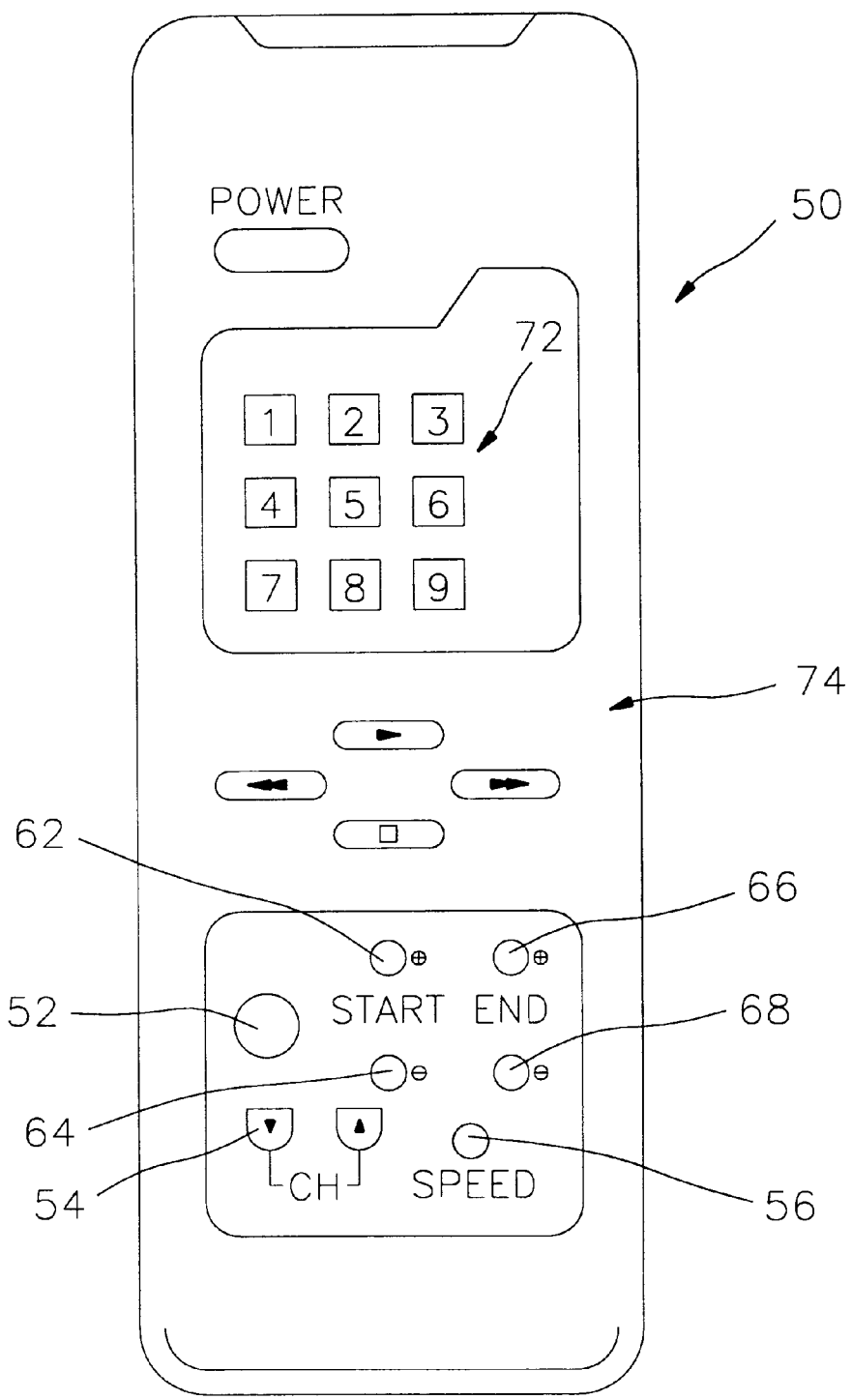
FIG. 2 is a plan view of a remote control unit which produces operation signals to the system controller shown in FIG. 1.

As clearly shown in FIG. 2, the remote control unit 50 has a reservation key 52, a channel selection key 54, a tape speed selection key 56 and change keys including a recording start time increment (+) and decrement (−) key 62 and 64 and a recording end time increment (+) and decrement (−) key 66 and 68 together with a plurality of such other keys as numeric keys 72 and operation keys 74.

The reservation key 52 functions to generate a signal indicative of the preprogramming commencement or completion when it is pressed. In response to the preprogramming commencement signal generated when the reservation key 52 is operated, the system controller 10 simultaneously sets up or initializes preprogramming information including a recording start time, a recording channel, a tape speed, and a recording end time. Specifically, the recording start time is set at a current time clocked at the time of the preprogramming as indicated on the timer 15, the recording channel is set to the channel in use at the time of the preprogramming and the tape speed is set at any one of the available tape speeds such as SP, LP and SLP. And then, the recording end time is set at a time that is calculated by adding a predetermined duration of recording, which may be equivalent to a program length, e.g., two hours, to the recording start time.

While the initialization procedure is carried out by simply pressing the reservation key 52 once, it may be necessary to individually fit or adjust the recording start time and the recording end time to coincide with the actual broadcast schedule of a desired broadcast program for the recording thereof. The recording start time and the recording end time can be changed or adjusted using the start time increment (+)/decrement (−) key 62 and 64 and the end time increment (+)/decrement (−) key 66 and 68, respectively. The start time increment (+) key 62 is used to delay the recording start time from the current time, while the start time decrement (−) key 64 is used to step up the recording start time, which may have been erroneously set to be late. Thereafter, the recording end time will be automatically set at a new end time which is calculated by adding the predetermined duration of recording to the adjusted start time. Further, the end time adjustment keys including the end time increment (+) and decrement (−) key 66 and 68 may be employed to further adjust the recording end time to an actual end time of the desired broadcast program. In addition, in accordance with the present invention, it is possible to adjust or change the recording channel and the tape speed through the use of the channel selection key 54 and the tape speed selection key 56 as well known in the art, respectively.

After adjusting or changing the recording start time, the recording end time, the recording channel and the recording tape speed, the reservation key 52 is pressed once again so as to signify the completion of the preprogramming process made in accordance with the present invention.

Details of the simplified preprogramming operation will be explained referring to FIGS. 3–9 in parallel with FIGS. 1 and 2 hereinafter.

Figure 3:
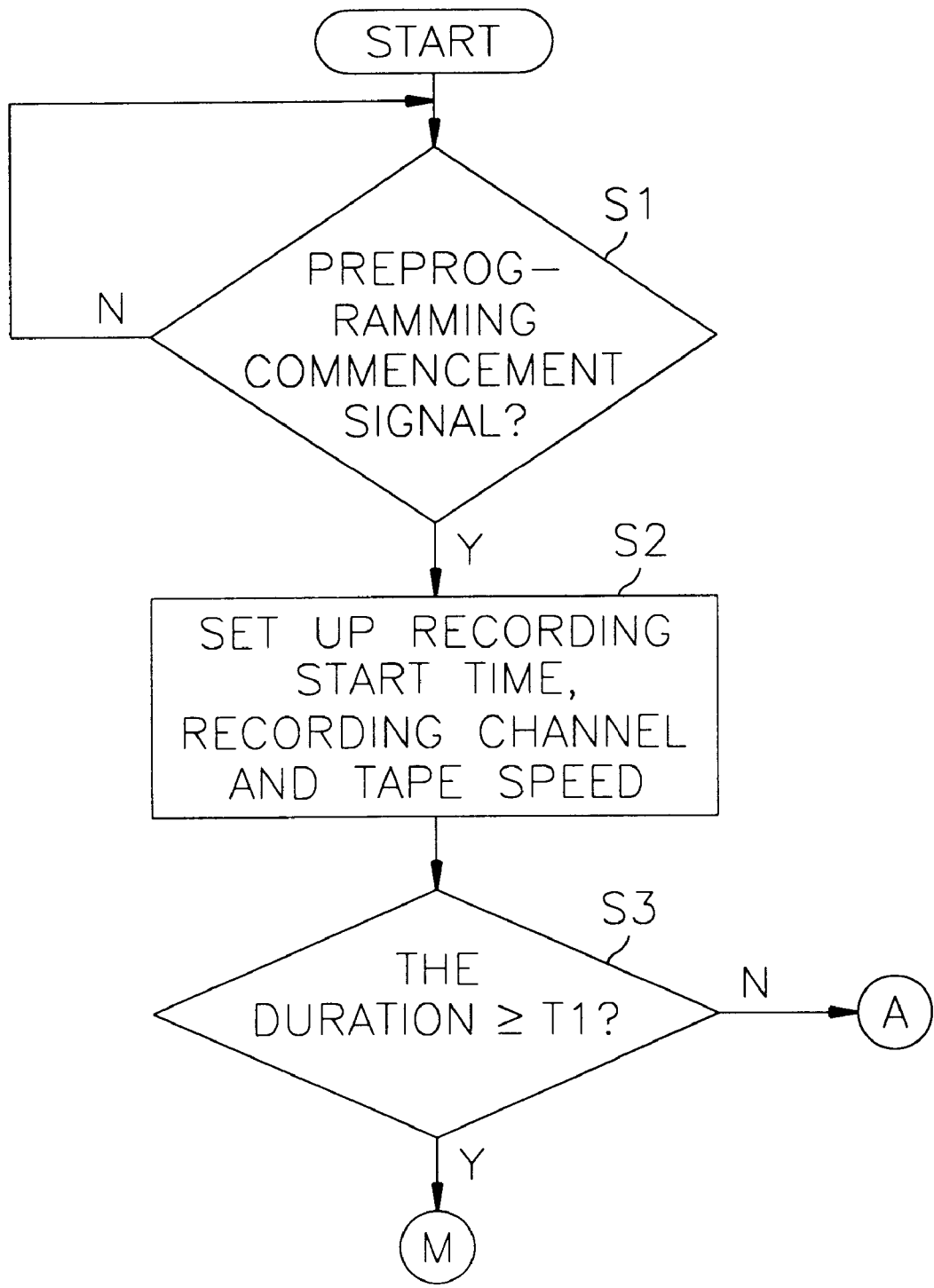
FIGS. 3–8 are flow charts illustrating the operation of the system controller shown in FIG. 1, respectively.

As shown in FIG. 3, the simplified preprogramming process in accordance with the invention directly begins by simply pressing the reservation key 52 wherein a signal is outputted as a preprogramming commencement signal from the reservation key 52 through the receiver 60 to the system controller 10. When the preprogramming commencement signal issued by operating the reservation key 52 in step S1 is received by the system controller 10, the process proceeds to step S2. In step S2, in response to the preprogramming commencement signal, the system controller 10 automatically sets up preprogramming information including the recording start time, the recording channel and the recording tape speed all at once.

In the initial setting process of the preprogramming information in accordance with the invention, the recording start time is set at the current time which is read from the timer 15 at the time of preprogrammimg the VCR, the recording channel is set to a desired channel prior to preprogramming the VCR, the tape speed is set at a predetermined recording tape speed, for example, LP mode. In this connection, because the channel for recording is set to a currently tuned channel at the time of preprogramming the VCR in accordance with the invention, it is desirable to tune the VCR to a desired channel prior to preprogramming the VCR.

FIG. 9A shows exemplary on screen graphics resulting from the steps S1 and S2 which illustrate original graphics including such letters as TIMER RESERVATION, CHANNEL, TAPE SPEED, DATE, START TIME and END TIME in that order and their associated preprogramming information. In this drawing, particularly, it can be seen that the start time for the recording is set at a current time, e.g., 09:35, at the time of preprogramming the VCR; and the end time for the recording is set at a time (11:35) which is obtained by adding a predetermined duration of recording, e.g., 2 hours, to the recording start time.

Figure 4:
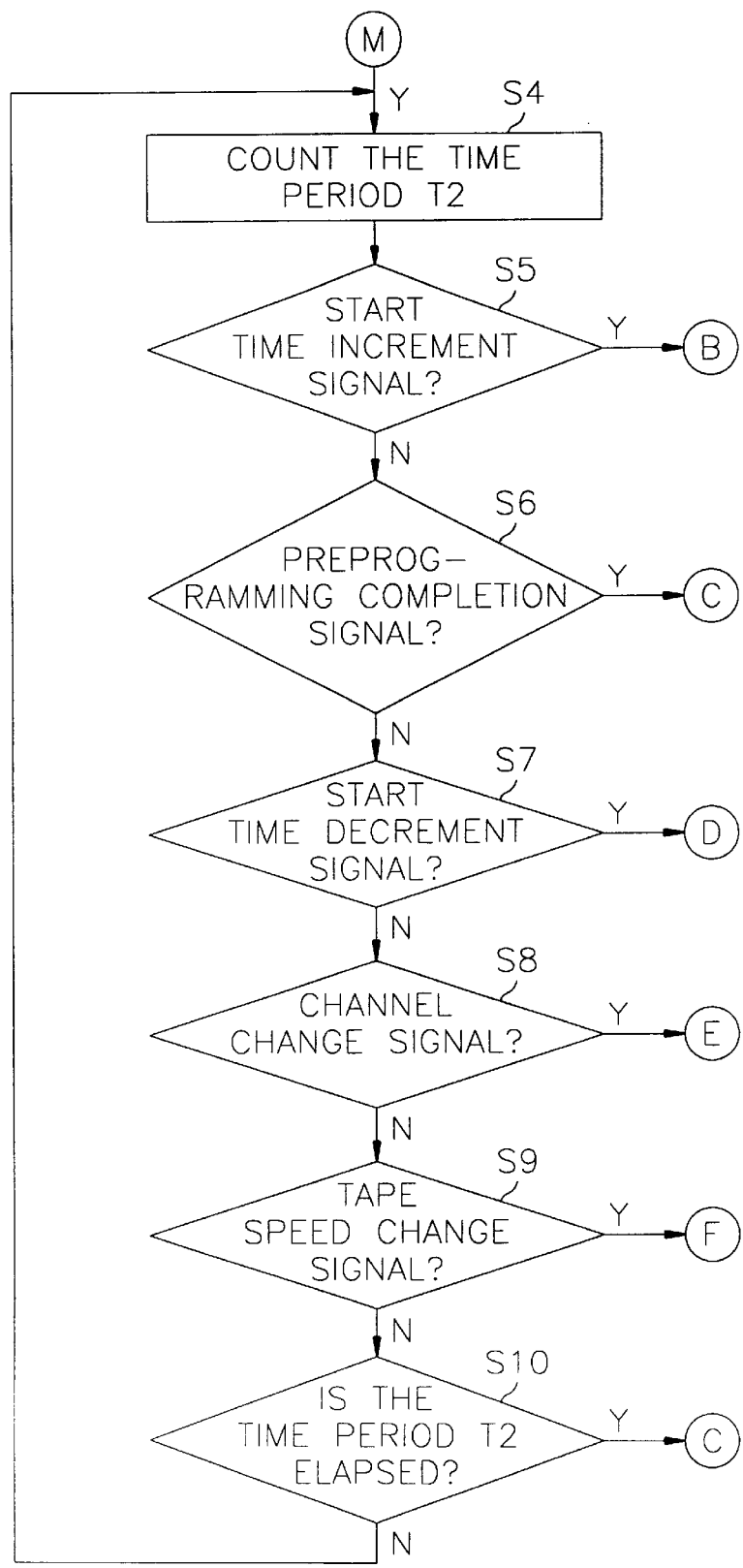
Figure 5:
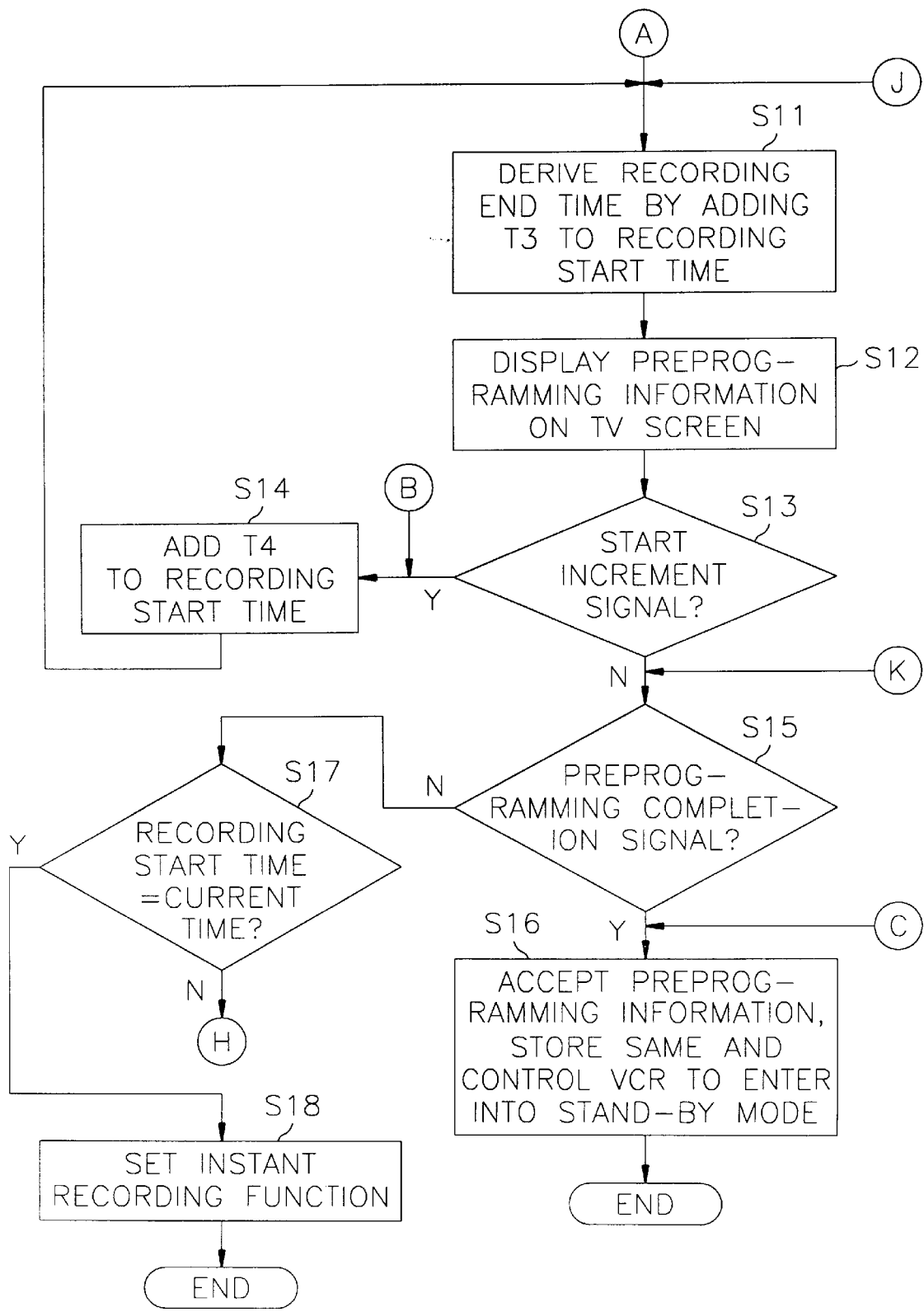

And then, the process proceeds to step S3 where it is determined whether the preprogramming commencement signal is continuously issued from the reservation key 52 for a time longer than a predetermined time period T1, e. g., 3 seconds. If the determination is negative, meaning that the VCR's user does not want to change all or any of the recording start time, the recording channel, the recording tape speed and the recording end time initially set at the step S2, then the process goes to step S11 as shown in FIG. 5 through a tab A. If, however, the determination is positive, implying that the user wants to change all or some of the initially set preprogramming information, the process flows to step S4 as shown in FIG. 4 through a tap M. In other words, the determination process at the step S3 is carried out at the system controller 10 by checking whether the preprogramming commencement signal is received through the receiver 60 from the remote control unit 50.

In step S4 tapped from the step S3 through the tap M, as shown in FIG. 4, when the preprogramming commencement signal is continuously received by the system controller 10 for a time interval longer than T1, the system controller 10 begins to count a predetermined time period T2, e.g., 10 seconds. While the counting continues, the system controller 10 checks whether or not a signal for adjusting the initially set preprogramming information is generated from any of the keys on the remote control unit 50 as in steps S5–S9. These steps S5–S9 are performed to adjust the preprogramming information. If no adjustment signal is generated during the time period T2, at step S10, the process passes directly to step S16 as shown in FIG. 5 through a tab C, wherein the system controller 10 preprograms the VCR based on the initially set preprogramming information. However, if the user wants to adjust the initially set preprogramming information, he (or she) can adjust the preprogramming information referring to the on screen graphics shown in the TV screen 45 through the following adjustment procedure.

In step S5, if a start time increment signal is generated from the start time increment key 62, the process goes to step S14 as shown in FIG. 5 via a tab B for adjusting the recording start time to a desired time.

In step S6, if a preprogramming completion signal is generated from the reservation key 52 by pressing it once again, the process advances to the step S16 as shown in FIG. 5 through a tab C for completing the preprogramming of the VCR.

Figure 6:
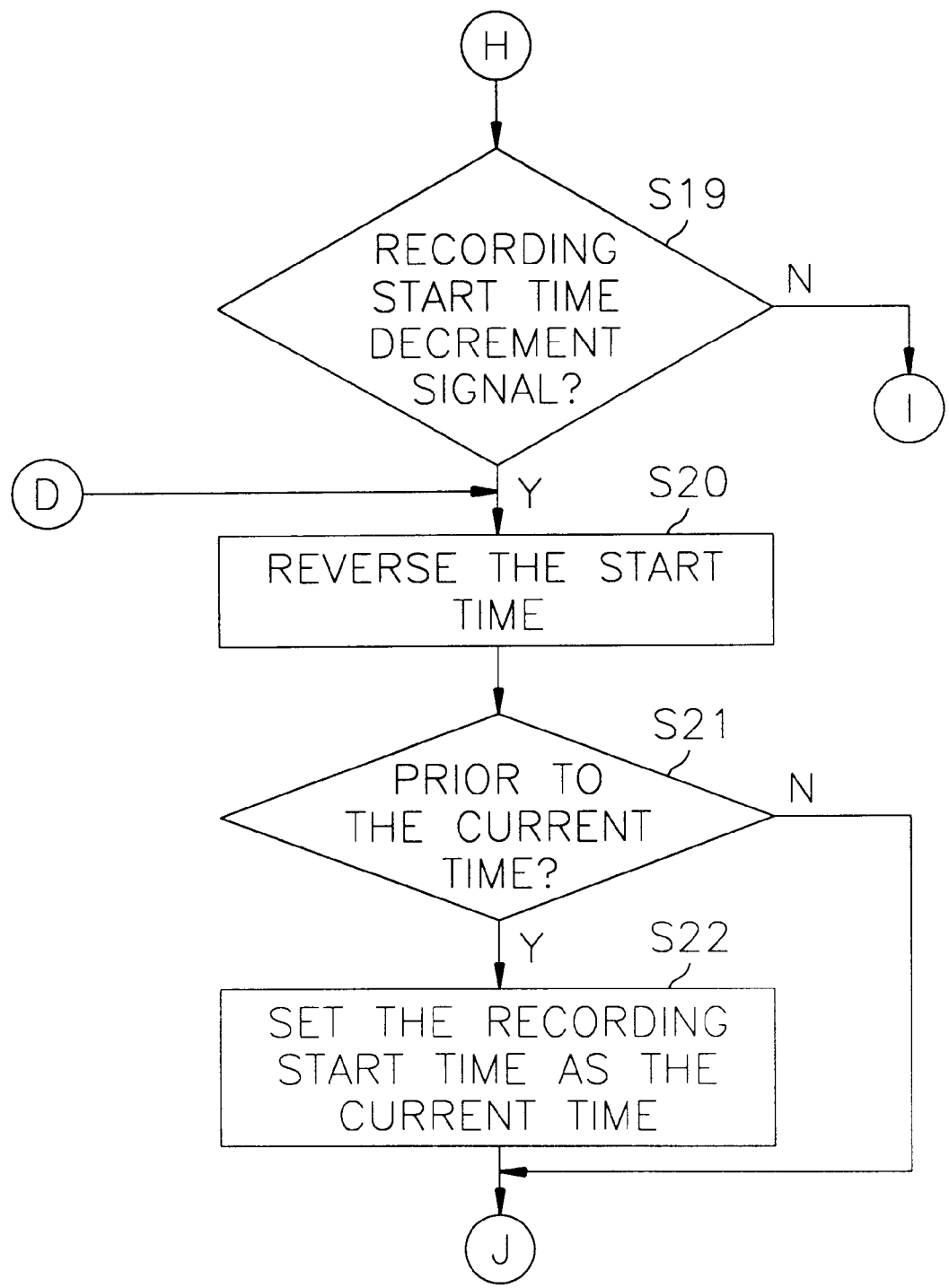

In step S7, if a start time decrement signal is generated from the start time decrement key 64, the process flows to step S20 as shown in FIG. 6 through a tab D, for stepping the recording start time.

Figure 8:
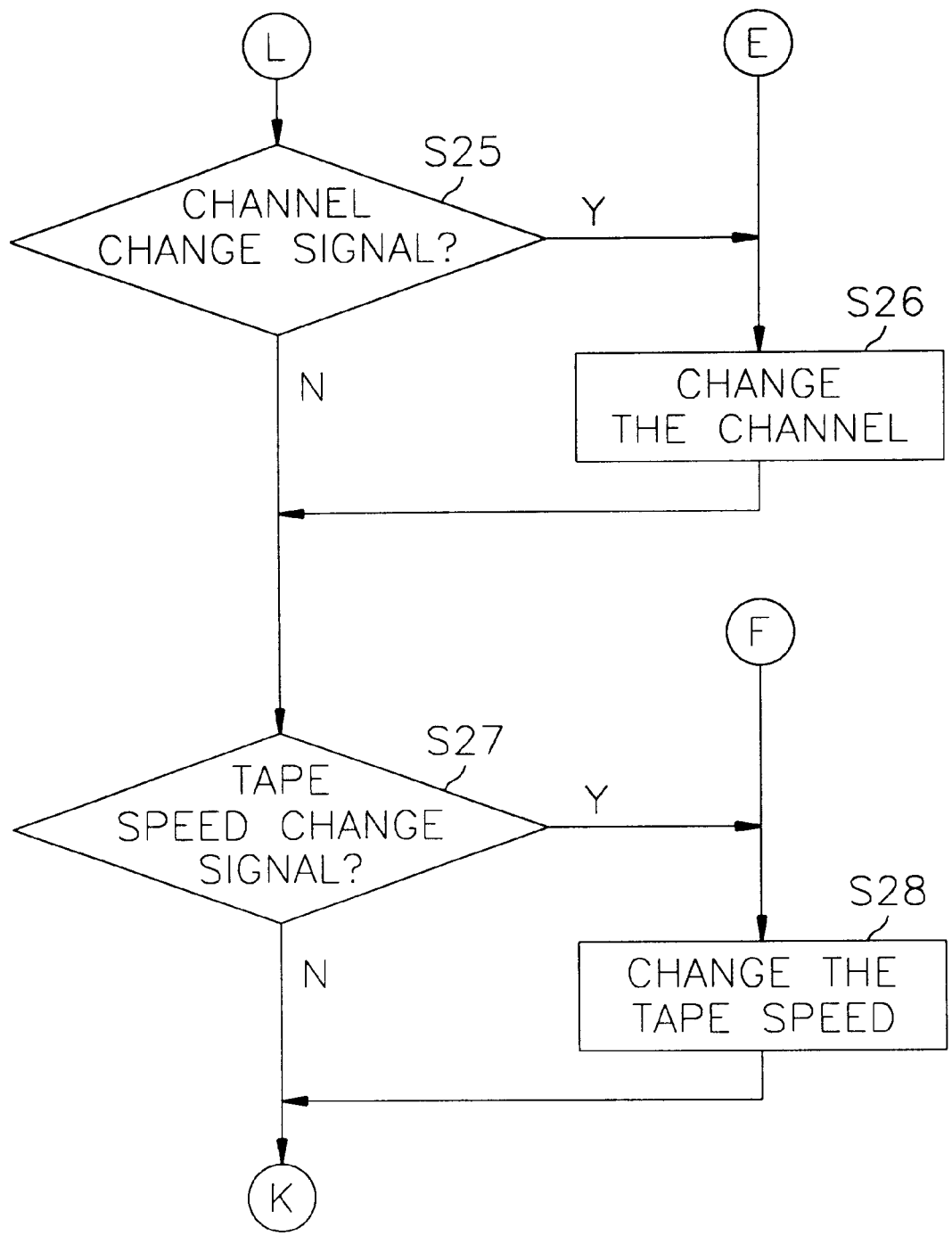

In step S8, if a channel change signal is generated from the channel selection key 54, the process proceeds to step S26 as shown in FIG. 8 through a tab E for changing the recording channel.

In step S9, if a recording tape speed change signal is generated from the recording speed selection key 56, the process passes to step S28 as shown in FIG. 8 through a tab F for changing the recording tape speed.

With reference to FIGS. 5–8, there are shown details of the adjustment process of the preprogramming information initially set at the step S2. First of all, as shown in FIG. 5, in step S11 following the step S3 through the tap A, the recording end time is derived by adding the predetermined duration of recording T3 to the recording start time set at the step S2. After deriving the recording end time, the process goes to step S12 where, for the convenience of the adjustment of the preprogramming information, the system controller 10 displays, on the TV screen 45 through the OSD circuit 35, the preprogramming information including the recording start time, the recording channel, the recording tape speed and the recording end time which are set at the steps S2 and S11, respectively.

Thereafter, in step S13, it is determined whether the start time increment signal is generated from the start time increment (+) key 62. If so, the process goes to step S14. In step S14, the recording start time is adjusted by incrementing it by a preset time interval T4, e.g., 5 minutes, whenever the start time increment (+) key 62 is pressed until it reaches a desired recording start time.

After adjusting the recording start time in the step S14, the process returns to step S11 to adjust the recording end time based on the adjusted recording start time. In step S13, if it is determined that the start time increment signal is not generated, the process proceeds to step S15. In step S15, the system controller 10 determines whether the preprogramming completion signal is issued from the reservation key 52 or not. If the determination is positive, the process proceeds to step S16. If otherwise, the process passes to step S17 wherein the recording start time which is initially set at the step S2 or adjusted at the step S14 is compared with the current time read from the timer 15. If the recording start time is identical to the current time, the process goes to step S18 wherein the system controller 10 controls the recording/playback device 25 to immediately start to record the TV program of the recording channel by using a conventional instant recording technique; and if otherwise, the process proceeds to step 19 as shown in FIG. 6 through a tab H.

In step S16, on the other hand, in response to the preprogramming completion signal generated by the operation of the reservation key 52, the system controller 10 preprograms the VCR based on the initially set preprogramming information or adjusted preprogramming information, stores same into the RAM 13 and controls the VCR to enter into a stand-by mode for the preprogramming recording and ends the process. As described above, the recording start time can be adjusted by using the start time increment(+) key 62. However, in case where the adjusted recording start time to commence the recording of the desired broadcast program is already passed, it will be required to reverse the late start time.

FIG. 6 is a flow chart illustrating the procedure to restore or reverse the late start time.

Figure 7:
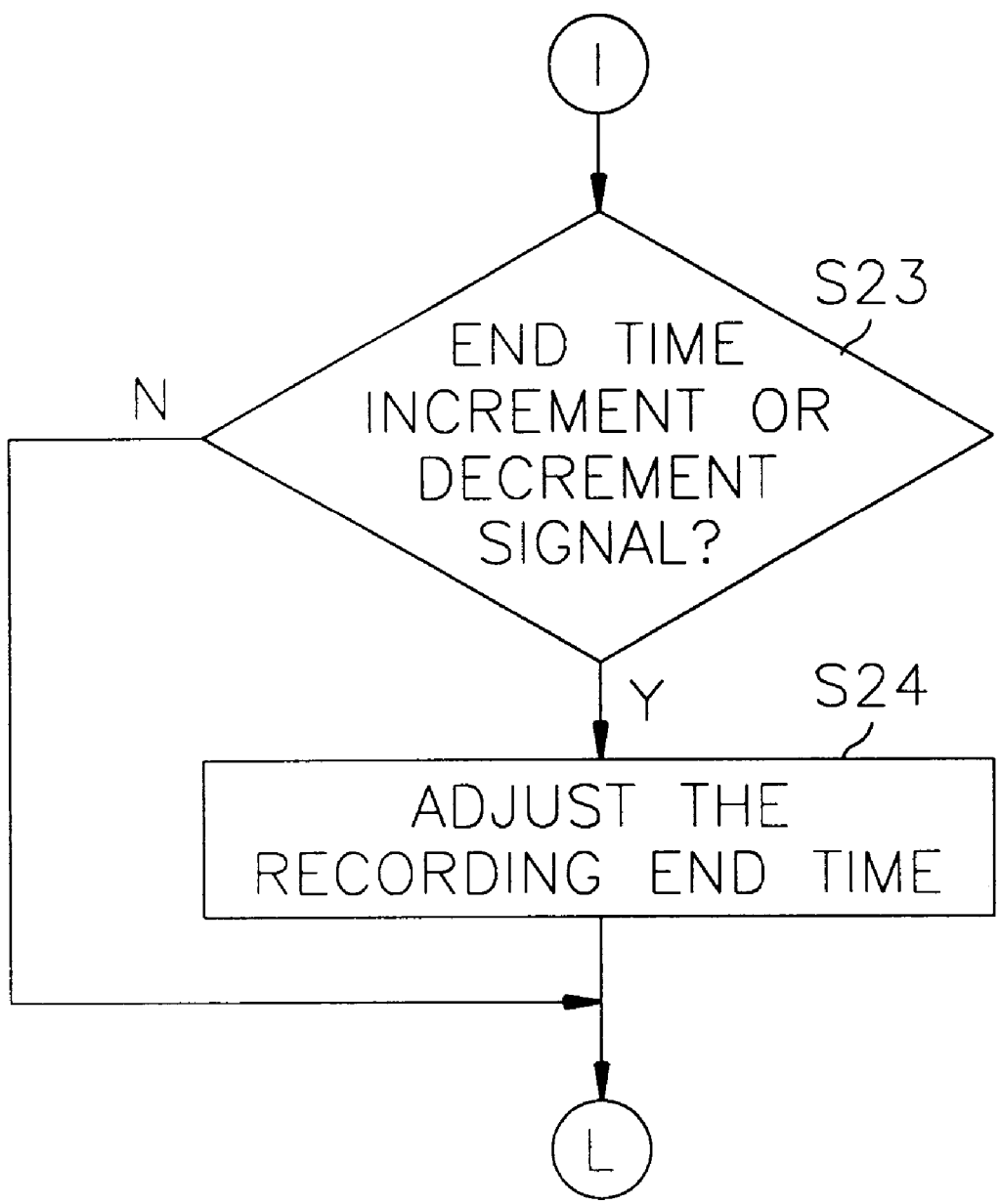

In step S19, the system controller 10 determines whether the start time decrement signal is issued from the start time decrement key 64 or not. If not, the process proceeds to step S23 as shown in FIG. 7 through a tab I. However, if the start time decrement signal has been issued, the process passes to step S20 to back up or reverse the start time by a time interval T5 whenever the start time decrement signal is issued. It may be desirable to program the time interval T5 to be a few minutes, for example, 3 minutes, for the purpose of performing a quick adjustment.

However, in case where the reversed start time in step S20 is earlier than the current time indicated on the timer 15, the preprogrammed recording cannot be accomplished. Therefore, the changed recording start time should be set on or after the current time read from the timer 15.

Accordingly, in step S21, it is checked whether the reversed or stepped-up start time is earlier than the current time. If it is not earlier, the process returns to step S14 as shown in FIG. 5 through a tap J without proceeding to step S22. If it is earlier than the current time, the process goes to step S22 where the system controller 10 sets the recording start time at the current time indicated on the timer 1 and then the process returns to step S11 through the tab J.

On the other hand, if the predetermined duration of recording T3 is different from the length of a desired broadcast program, the end time increment and decrement key 66 and 68 are used to adjust the predetermined duration of recording to the actual length of the desired broadcast program.

FIG. 7 illustrates a flow chart explaining the adjustment of the recording end time.

In step S23, the system controller 10 checks whether or not the end time increment or decrement signal has been issued from the end time increment key 66 or decrement key 68. If the increment signal or decrement signal has been issued, the process proceeds to step S24; and if otherwise, the process flows to step S25 as shown in FIG. 8 through a tab L. In step S24, the end time is increased or decreased by a time interval T6 upon the pressing of the end time increment key 66 or the end time decrement key 68. In accordance with a preferred embodiment of the present invention, it is desirable to program the time interval T4 or T5 which is used to adjust the recording start time to be more precise or finer than the time interval T6 used to adjust the recording end time.

Turning now to FIG. 8, there is shown a flow chart illustrating the process of adjusting the recording channel and the tape speed. In step S25, the system controller 10 checks whether or not the channel change signal has been generated from the channel selection key 54. When it has been generated, the process advances to step S26 where the system controller 10 allows the tuner 20 to change the recording channel to another. Alternatively, the numeric key 72 may be used to directly select the recording channel as well known in the art.

In step S25, if the channel selection signal has not been issued, the process passes to step S27 where the system controller 10 checks whether the tape speed change signal has been issued or not. In step S27, if the tape speed change signal has been issued, the process goes to step S28 wherein the system controller 10 lets the tape speed selector 60 change the tape speed. If the tape speed change signal has not been issued, the process returns to the step S15 as shown in FIG. 5 through a tab K; and the adjustment procedure of the timer-controlled preprogramming will be completed by pressing the reservation key 52 once again. At the same time, at step S16, the desired broadcast program is preprogrammed based on all of the adjusted preprogramming information and is stored in the RAM 13 for the preprogramming recording; and the VCR enters into a stand-by mode until the recording starts.

FIG. 9B illustrates an exemplary on screen graphics generated when the keys 66, 54 and 56 are pressed, respectively, as in steps S23, S25 and S27, indicating that the recording end time, the channel and the tape speed are further adjusted from the information displayed in FIG. 9A, respectively.

While the present invention has been described with respect to the particular embodiments, it will be apparent to those skilled in the art that various changes and modifications may be made without departing from the spirit and the scope of the invention as defined in the claims.

What is claimed is:

1. A method for timer-controlled preprogramming a video cassette recorder (VCR) to record a desired television (TV) broadcast program, the method comprising the steps of:

(a) generating a preprogramming commencement signal when a user presses a key, corresponding to the commencement signal, on a key matrix of the VCR or a remote control unit to record the preprogramming of the VCR;

(b) automatically setting, in response to the preprogramming commencement signal, a recording start time, a recording channel and a recording tape speed all at once, wherein the recording start time is set at a current time clocked at the time of preprogramming, the recording channel is set to a current channel tuned at the time of preprogramming and the recording tape speed is set at a predetermined recording tape speed;

(c) determining a recording end time by adding a predetermined duration of recording to the recording start time;

(d) displaying, on the TV screen, the recording start time, the recording channel, the recording tape speed and the recording end time;

(e) adjusting the recording start time displayed on the TV screen in an on-touch screen manner so as for it to coincide with an actual broadcast schedule of the desired TV broadcast program and adjusting the recording end time displayed on the TV by adding the predetermined duration of recording to the adjusted recording start time by using the on-touch screen manner; and (f) deciding whether or not a preprogramming completion signal has been received from the user after performing the step (e), and, if there is the preprogramming completion signal from the user, accepting preprogramming information including the adjusted recording start time, the recording channel, the recording tape speed and the adjusted recording end time to preprogram the desired TV broadcast program, storing the preprogramming information into a storage device of the VCR and controlling a recording/playback device of the VCR so that the VCR enters into a stand-by mode until the adjusted recording start time reaches.

2. The method of claim 1, wherein the step (e) includes the steps of:

(e1) if a signal for changing the recording channel displayed on the TV screen is received from the user, changing the recording channel to a desired channel in the on-touch screen manner; and (e2) if a signal for changing the recording tape speed displayed on the TV screen is received from the user, changing the recording tape speed to a desired recording tape speed in the on-touch screen manner.

3. The method of claim 2, wherein the step (e) further includes the steps of:

(e3) determining whether or not the preprogramming commencement signal is generated for a continued period exceeding a predetermined time period; and (e4) if the continued period of the preprogramming commencement signal generation exceeds the predetermined time period, extending the recording start time in order to delay the start of recording from the current time by the continued period of the preprogramming commencement signal generation.

4. The method of claim 3, further comprising, after the step (c), the steps of:
   (c1) comparing the recording start time set at the step (b) with a current time indicated on a timer of the VCR; and
   (c2) if the recording start time is identical to the current time, immediately starting to record the TV program of the recording channel set at the step (b).

5. The method of claim 4, wherein an auxiliary voltage is supplied from an auxiliary power supply of the VCR when an AC input from a main power supply of the VCR is interrupted, wherein the voltage is applied to the timer and the storage device to save the time data in the timer and the preprogramming information stored in the storage device.

6. The method of claim 1, wherein, at the step (c), the predetermined duration of recording is two hours.

7. The method of claim 6, wherein the step (c) includes the step of increasing or decreasing the predetermined duration of recording so as to make it coincide with the actual length of the desired TV broadcast program.

8. The method of claim 1, wherein the predetermined recording tape speed is one of SP (Standard Playback), LP (Long Playback) and SLP (Super Long Playback).

9. The method of claim 1, further comprising, prior to the step (a), the step of tuning the VCR to the desired TV broadcast program.

* * * * *